(12) United States Patent
Hammer et al.

(10) Patent No.: US 10,051,065 B2
(45) Date of Patent: Aug. 14, 2018

(54) SYSTEM AND METHOD FOR DISCOVERING INTERNET PROTOCOL (IP) NETWORK ADDRESS AND PORT TRANSLATION BINDINGS

(71) Applicant: Yaana Technologies LLC, Milpitas, CA (US)

(72) Inventors: Michael P. Hammer, Reston, VA (US); David Grootwassink, Safety Harbor, FL (US); Curt Schwaderer, Urbandale, IA (US); Leigh Alexander Porter, London (GB); Rajesh Puri, Fremont, CA (US); Kai Bang Liu, Portland, OR (US)

(73) Assignee: Yaana Technologies LLC, Milpitas, CA (US)

( * ) Notice: Subject to any disclaimer, the term of this patent is extended or adjusted under 35 U.S.C. 154(b) by 59 days.

(21) Appl. No.: 15/351,039

(22) Filed: Nov. 14, 2016

(65) Prior Publication Data

US 2017/0142208 A1    May 18, 2017

Related U.S. Application Data

(60) Provisional application No. 62/255,330, filed on Nov. 13, 2015.

(51) Int. Cl.
| | |
|---|---|
| *H04L 12/26* | (2006.01) |
| *H04L 29/08* | (2006.01) |
| *H04L 29/12* | (2006.01) |
| *H04L 29/06* | (2006.01) |

(52) U.S. Cl.
CPC ............. *H04L 67/16* (2013.01); *H04L 43/08* (2013.01); *H04L 61/2007* (2013.01); *H04L 65/1033* (2013.01)

(58) Field of Classification Search
None
See application file for complete search history.

(56) References Cited

U.S. PATENT DOCUMENTS

| | | | |
|---|---|---|---|
| 9,712,421 B2* | 7/2017 | Dolson | H04L 43/12 |
| 9,736,111 B2* | 8/2017 | Lopez Da Silva et al. | H04L 61/2592 |
| 9,860,195 B2* | 1/2018 | Javali | H04L 49/25 |
| 9,876,759 B2* | 1/2018 | Ghai | H04L 61/2557 |
| 2011/0268121 A1* | 11/2011 | Karino | H04L 12/4633 370/392 |

(Continued)

*Primary Examiner* — Otis L Thompson, Jr.
(74) *Attorney, Agent, or Firm* — Steptoe & Johnson LLP

(57) ABSTRACT

A system and method for discovering Internet Protocol (IP) network address and port translation bindings is disclosed. According to one embodiment, a system for creating IP data records, includes a carrier grade network address and port translation (CGNAPT) node in communication with a private network on an internal side and a public network on an external side. The system further includes a private Ethernet span port disposed on the internal side of the CGNAPT node that receives packet streams traversing the CGNAPT node. A public Ethernet span port is disposed on the external side of the CGNAPT node that receives packet streams traversing the CGNAPT node. The private Ethernet span port and the public Ethernet span port copy packet streams traversing the CGNAPT node and deliver the copied packet streams to a deep packet inspection host.

16 Claims, 5 Drawing Sheets

(56) References Cited

U.S. PATENT DOCUMENTS

| | | | |
|---|---|---|---|
| 2012/0297087 A1* | 11/2012 | Humble | H04L 41/0213 709/238 |
| 2013/0346629 A1* | 12/2013 | Wang | H04L 61/2532 709/245 |
| 2014/0274000 A1* | 9/2014 | Gosselin | H04M 3/4365 455/415 |
| 2014/0286337 A1* | 9/2014 | Dolson | H04L 43/12 370/392 |
| 2014/0344908 A1* | 11/2014 | Rizzo | H04L 67/2814 726/6 |
| 2015/0139230 A1* | 5/2015 | Zha | H04L 61/2525 370/390 |
| 2015/0304275 A1* | 10/2015 | Ghai | H04L 61/2557 709/245 |
| 2015/0372973 A1* | 12/2015 | Lopez Da Silva et al. | H04L 12/2818 370/254 |
| 2016/0072766 A1* | 3/2016 | Jain | H04L 61/2567 709/228 |
| 2016/0359798 A1* | 12/2016 | Choquette | H04L 65/1023 |
| 2017/0195256 A1* | 7/2017 | Javali | H04L 49/25 |
| 2017/0250944 A1* | 8/2017 | Hong | H04L 61/10 |
| 2017/0373961 A1* | 12/2017 | Dolson | H04L 63/306 |
| 2018/0034770 A1* | 2/2018 | Rajagopalan | H04L 12/1407 |

* cited by examiner

SYSTEM AND METHOD FOR DISCOVERING INTERNET PROTOCOL (IP) NETWORK ADDRESS AND PORT TRANSLATION BINDINGS

CROSS-REFERENCE TO RELATED APPLICATIONS

This application claims the benefit of U.S. Provisional Application No. 62/255,330, filed Nov. 13, 2015, which is herein incorporated by reference in its entirety.

FIELD

The present disclosure relates in general to computer systems. In particular, the present disclosure relates to a system and method for discovering Internet Protocol (IP) network address and port translation bindings.

BACKGROUND

The exhaustion of IPv4 address space has driven many Communication Service Providers (CSP) to deploy Carrier Grade Network Address Translation (CGNAT) gateways within and on the edges of their networks. These gateways enable a large number of internally routable IP addresses assigned by the CSP to its customers from a private address pool to temporarily be bound to a much smaller number of publicly routable IP addresses allocated to the CSP, enabling hosts on the Internet to reach the CSP's customers and vice versa.

The maximum number of concurrently assigned address bindings possible is limited by the total number of public IP addresses, which may be owned by the CSP. As a result, many gateways also use the 65,535 possible ports for each IP address as a means to extend the possible number of concurrent bindings. These are called Network Address and Port Translation (NAPT) gateways. Furthermore, to maximize the usage of the public IP and Port range, these bindings are kept only so long as there is traffic traversing the "pinholes" through the NAPT gateway, i.e. the binding-setween the private and public addresses.

In addition, in order to solve the limits of IPv4, the IETF created IPv6 with a greatly expanded address space. However, that also leads to the issue of how to transition both clients on customer hosts and servers supporting applications on company hosts as they independently transition from IPv4 to IPv6. That transition has led to a plethora of NAPT-based services to map between the two address types, such as NAT64 and NAT464, to enable IPv4 clients to access IPv6 servers, IPv6 clients to access IPv4 servers, IPv4 hosts to communicate over IPv6 intermediate networks, and IPv6 hosts to communicate over IPv4 networks. All such address translations need to be supported and logged.

Unfortunately, many of these gateways have substantially inadequate logging facilities resulting in major logging errors or even no logs even at utilizations substantially lower than the platform maximum. Because the primary purpose of NAPT is to set up and tear down bindings (pinholes), when CPU and memory resources become constrained during busy periods, secondary processes like logging stop. When logging and accounting record generation stops, that leaves network operators blind as to what traffic is entering and leaving their network and where that traffic is terminating insides there networks. As a result, any sort of forensic traffic analysis is not possible.

SUMMARY

A system and method for discovering Internet Protocol (IP) network address and port translation bindings is disclosed. According to one embodiment, a system for creating IP data records, comprises a carrier grade network address and port translation node in communication with a private network on an internal side and a public network on an external side, packet streams transmitted between the private network and the public network traverse the carrier grade network address and port translation node. The system further comprises a private Ethernet span port disposed on the internal side of the carrier grade network address and port translation node receives packet streams traversing the carrier grade network address and port translation node. A public Ethernet span port is disposed on the external side of the carrier grade network address and port translation node receiving packet streams traversing the carrier grade network address and port translation node. A deep packet inspection host is in communication with the private Ethernet span port and the public Ethernet span port. The private Ethernet span port and the public Ethernet span port copy packet streams traversing the carrier grade network address and port translation node and deliver the copied packet streams to the deep packet inspection host.

Other features and advantages will become apparent from the following detailed description, taken in conjunction with the accompanying drawings, which illustrate by way of example, the features of the various embodiments.

DETAILED DESCRIPTION

Figure 1:
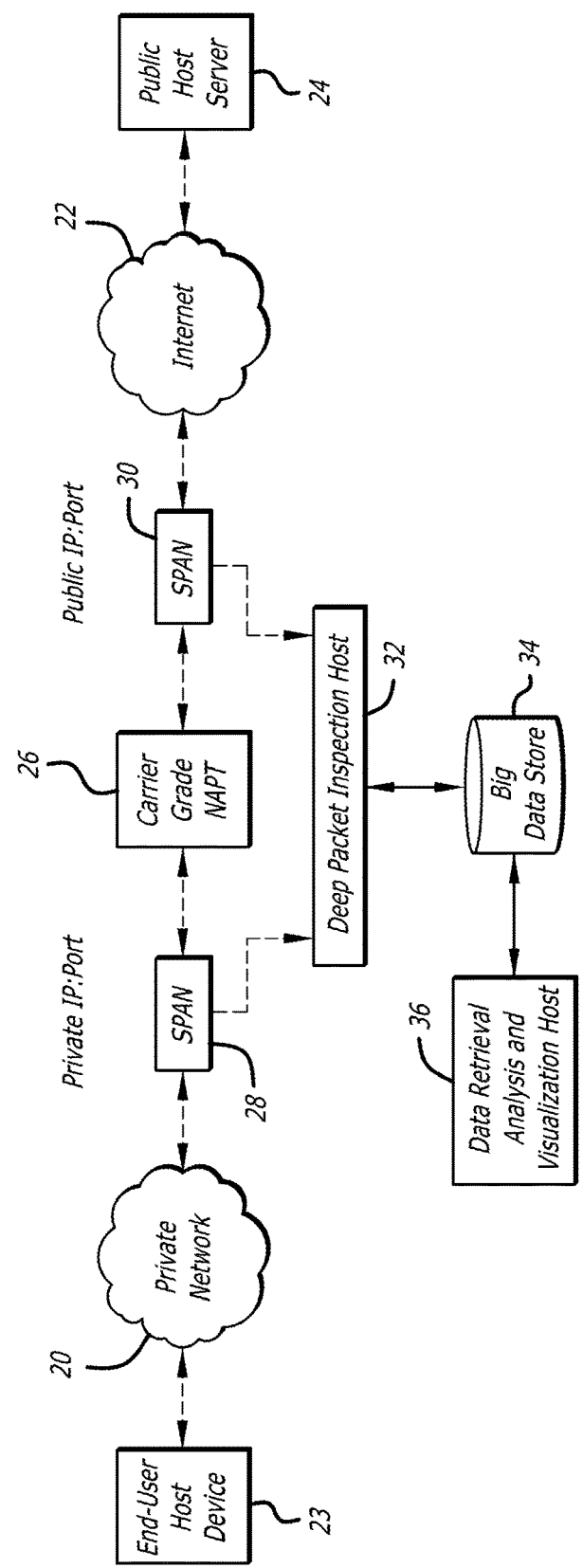
FIG. 1 depicts a simple example of a carrier grade Network Address and Port Translation gateways external logging system.

A system and method for discovering Internet Protocol (IP) network address and port translation bindings is disclosed. According to one embodiment, a system for creating IP data records, comprises a carrier grade network address and port translation node in communication with a private network on an internal side and a public network on an external side, packet streams transmitted between the private network and the public network traverse the carrier grade network address and port translation node. The system further comprises a private Ethernet span port disposed or deployed on the internal side of the carrier grade network address and port translation node receives packet streams traversing the carrier grade network address and port translation node. A public Ethernet span port is disposed on the external side of the carrier grade network address and port translation node receiving packet streams traversing the carrier grade network address and port translation node. A deep packet inspection host is in communication with the private Ethernet span port and the public Ethernet span port. The private Ethernet span port and the public Ethernet span port copy packet streams traversing the carrier grade network address and port translation node and deliver the copied packet streams to the deep packet inspection host.

Briefly, and in general terms, various embodiments are directed to a system for creating IP data records. In one embodiment, the system includes a carrier grade network address and port translation (CGNAPT) node in communication with a private network on an internal side and a public network on an external side. Packet streams transmitted between the private network and the public network traverse the CGNAPT node. The system also includes a private Ethernet span port disposed on the internal side of the CGNAPT node and receives packet streams traversing the CGNAPT node. There is a public Ethernet span port disposed on the external side of the CGNAPT node that receives packet streams traversing the CGNAPT node. The system of one embodiment also includes a deep packet inspection host in communication with the private Ethernet span port and the public Ethernet span port. The deep packet inspection host may be a hierarchical configuration of multiple deep packet inspection hosts or a single host. The private Ethernet span port and the public Ethernet span port copy packet streams traversing the CGNAPT node and deliver the copied packet streams to the deep packet inspection host. In one embodiment of the system, the deep packet inspection host correlates and identifies packet streams entering the CGNAPT node with packet streams exiting the carrier CGNAPT node. There may be any number of private or public networks with a plurality of CGNAPT nodes positioned between the plurality of public and private networks.

In one embodiment, the system may include a firewall combined with the CGNAPT node. The firewall may modify elements of the packet streams. The system may further include one or more host devices connected to the private network that request the CGNAPT node to open a binding with a server connected to the public network. A communications service provider may assign private IP addresses to the host devices, and the CGNAPT node may assign a public IP address and create a binding between the private IP address and the public IP address. In yet another embodiment, the CGNAPT node sets a timer to remove the binding between the private IP address and the public IP address.

The system may also include a data store in communication with the deep packet inspection host for storing the copied streaming packets or the final end-to-end path record of the processed packet streams. A data retrieval host may also be included in the system that is in communication with the data store for analyzing the copied streaming packets. The data retrieval host may be any local or remote computing device.

Other embodiments are directed to a method for correlating private outbound packets and public outbound packets to determine the carrier grade network address and port translation bindings. The method may include receiving inbound stream packets and outbound stream packets at a deep packet inspection host from a private Ethernet span port and a public Ethernet span port. The private Ethernet span port may be disposed on an internal side of a CGNAPT node that receives packet streams traversing the CGNAPT node between a private network and a public network. The public Ethernet span port may be disposed on the external side of the CGNAPT node receiving packet streams traversing the CGNAPT node. The method includes discarding inbound stream packets collected at the deep packet inspection host and distinguishing between private outbound stream packets and public outbound stream packets. The method may also include ordering by time private outbound stream packets in a lookback buffer. Furthermore, the method includes processing the public outbound stream packets to create bindings, reading the private outbound stream packets in the lookback buffer and processing the private outbound stream packets to create bindings. The log bindings of the public outbound stream packets and the private outbound stream packets may then be stored in memory.

In certain embodiments, the method includes determining the content size, sequence number and window size of the public outbound stream packets. In addition, destination IP addresses, destination port, and ACK number are also used for correlation. The method may include comparing a portion of one private outbound stream packet with a portion of one public outbound stream packet to determine a match.

One embodiment of the present system and method is an off-gateway Network Address and Port Translation (NAPT) logging solution that monitors private-side and public-side NAPT interfaces. The present system may output CDR-style Internet "Connection" Records (ICR) that matches internally, and possibly externally, visible Internet traffic sessions so that their original IP address and ports and all translations to external IP address and ports are recorded. The system may output other format types of records that are known in the art. Additional correlation of Communication Service Providers (CSP) assigned IP addresses with other traffic data, e.g. subscriber identifiers such as their MSISDN or Username are also may be performed. Combined with a high volume data retention and request management system, the present system and method is able to deliver an end to end system for NAT record extraction, retention, analysis, and disclosure. The present system and method uses various processes to reduce log volume by identifying parallel related flows belong to the same session.

In one exemplary embodiment as shown in FIG. 1, the system includes a single private internal network 20 and one public external network 22. A CSP assigns private IP addresses to end-user host devices 23 that may use one or more port addresses for each active application depending on how many communications sessions it needs to establish. Traffic leaving the private network 20 toward public host server 24 on the external network traverses the Carrier Grade Network Address and Port Translation gateway (CGNAPT) 26. The CGNAPT 26 temporarily assigns a public IP and port and creates a binding between the two addresses. The CGNAPT 26 sets a timer that upon expiry removes the binding. The timer may be set any time as desired and may be dynamic. Traffic through the binding may reset the timer. In one embodiment, TCP traffic may have a different behavior than UDP, since explicit TCP connection release traffic could also be relied on to remove the binding. In addition, some traffic carried over the CGNAPT 26 may not use or expose UDP or TCP ports, such as RSVP, ICMP, IPSec ESP, or GRE tunnels established by PPTP. The present system logs such traffic.

Still referring to FIG. 1, the system includes a private Ethernet Span port 28 on the internal side of the CGNAPT 26 and a public Ethernet Span port 30 on the external side of the CGNAPT. It has been contemplated that electrical or optical taps could be used instead. The private and public ports 28 and 30 may transparently copy all traffic to the CGNAPT 26 and deliver the copied data to a deep packet inspection (DPI) Host 32. The ports 28 and 30 may also copy all traffic from the CGNAPT. In other embodiments, selected traffic may be copied to (or from) the CGNAPT. In one embodiment, the DPI Host 32 correlates and identifies the packet streams entering the CGNAPT 26 with the packet streams exiting the CGNAPT.

As shown in FIG. 1, the DPI host 32 is in communication with a data store 34 that stores the copied data. A data retrieval analysis and visualization host 36 is connected to the data store 34 and may be used to retrieve and analyse the copied traffic. The data store 34 may use big data tools, such as Hadoop to store data, process requests in parallel and return results. Requests could for example return all private IP addresses associated with a public IP address and Port in a given timeframe. Searches based on private IP address and other packet parameters in some combination could also be performed. Analysis could be done iteratively to arrive at a better understanding of traffic patterns.

The nature of the packet streams is not necessarily one-to-one. NAPTs have numerous behaviors that may or may not allow one-to-many relationships between the internal and external addresses. It is also possible that the nature of the packet streams is such that the communications could be half-duplex or full-duplex. That is, an out-going stream may or may not correlate with any incoming stream, and vice versa.

In one embodiment, the CGNAPT 26 may be combined with a firewall that performs additional operations on the messages besides the modification of IP addresses and port numbers. For example, the firewall process may add, remove or modify other elements of the packet data headers. Since such changes are driven by the specific policies of a given network operator, they are non-deterministic and unpredictable.

In certain embodiments, there are protocols by which the users on the private network 20 may either request the CGNAPT 26 to open a binding or to communicate with a server on the public side of the CGNAPT to punch a hole (open a binding) through the CGNAPT and learn of the public address of that binding, such a NAT-PTP, STUN, TURN, ICE, etc.

Figure 2:
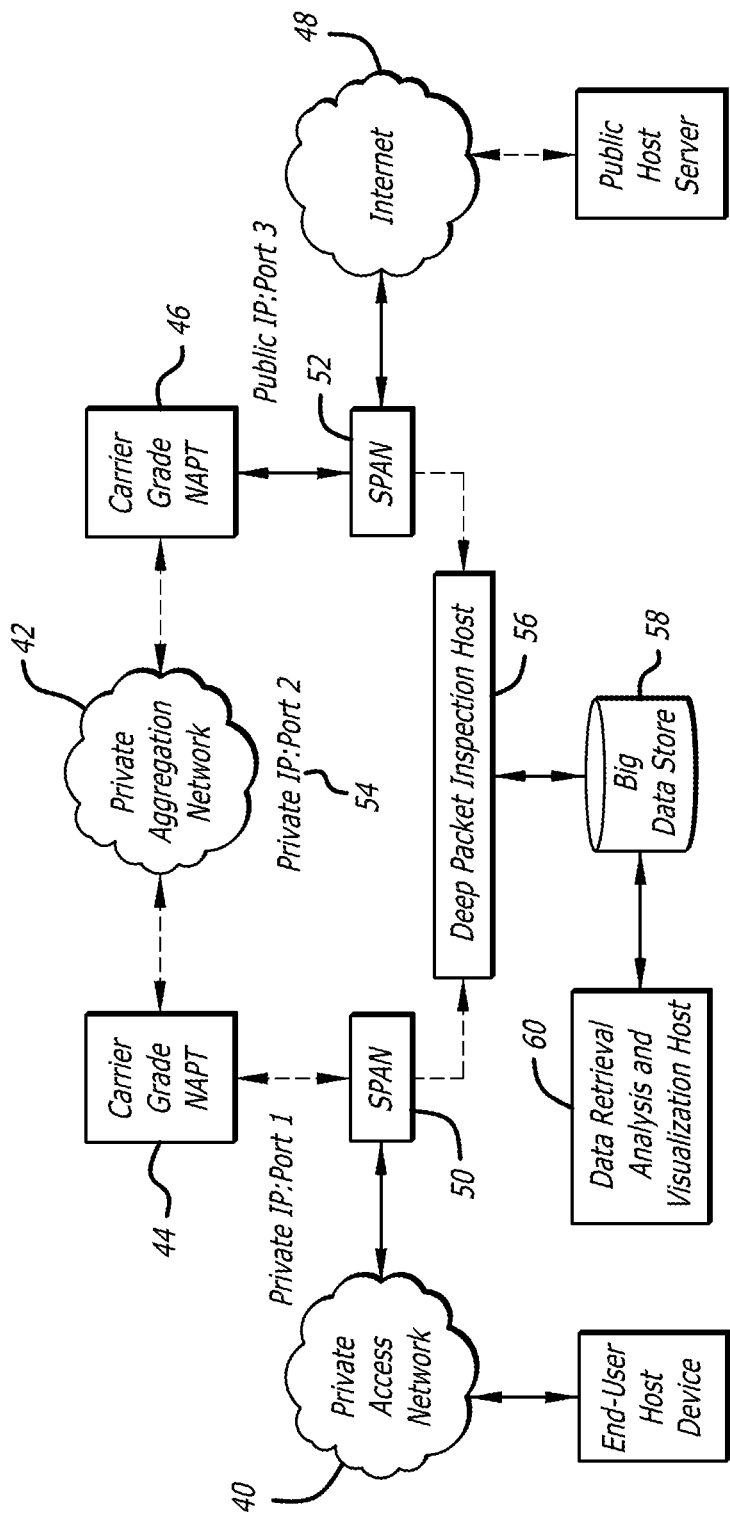
FIG. 2 depicts a nested example of a carrier grade Network Address and Port Translation gateways external logging system.

Another embodiment of a system is shown in FIG. 2. In this nested example, there are multiple private networks with CGNAPT between them as well as a CGNAPT between the private and public globally routable Internet. This may occur in very large networks where regional access networks may be aggregated by an overall national network before reaching a publicly routable international network like the Internet. FIG. 2 shows a system that includes a private access network 40 and a private aggregation network 42 separated by a first CGNAPT 44. A second CGNAPT 46 separates the private aggregation network 42 from a public network 48. The system shown in FIG. 2 also includes a first private Ethernet Span port 50 on the internal side of the first CGNAPT 44 and a public Ethernet Span port 52 on the external side of the second CGNAPT 46. It has been contemplated that electrical or optical taps could be used instead. In certain embodiments, there is also a second private Ethernet Span port 54 on the aggregation network 42 side of all gateways.

The present methods are used even if multiple networks and gateways are encompassed, since the aggregation network and the gateways would just appear like a very large gateway. Also the system depicted in FIG. 2 iteratively correlates traffic and records. As shown, the private and public ports 50 and 52 may transparently copy all traffic to the first and second CGNAPT 44 and 46, and deliver the copied data to a deep packet inspection (DPI) host 56. The ports 50 and 52 may also copy all traffic from the CGNAPT. In an embodiment including second private ports 54 on the aggregation network side of the gateways, the second private port 54 also copies all traffic to and from the CGNAPT 44 and 46 and send the copied traffic to the DPI host 56. In other embodiments, selected traffic may be copied to (or from) the CGNAPT. In one embodiment, the DPI host 56 correlates and identifies the packet streams entering the first and second CGNAPT 44 and 46 with the packet streams exiting the CGNAPT 44 and 46.

As shown in FIG. 2, the DPI host 56 is in communication with a data store 58 that stores the copied data. A data retrieval analysis and visualization host 60 is connected to the data store 58 and may be used to retrieve and analyse the copied traffic.

In addition, though the DPI host 56 is shown as a single host, multiple hosts in clusters or in different hierarchical configurations may be used to process traffic and intermediate records to result in the final end-to-end path record.

Figure 3:
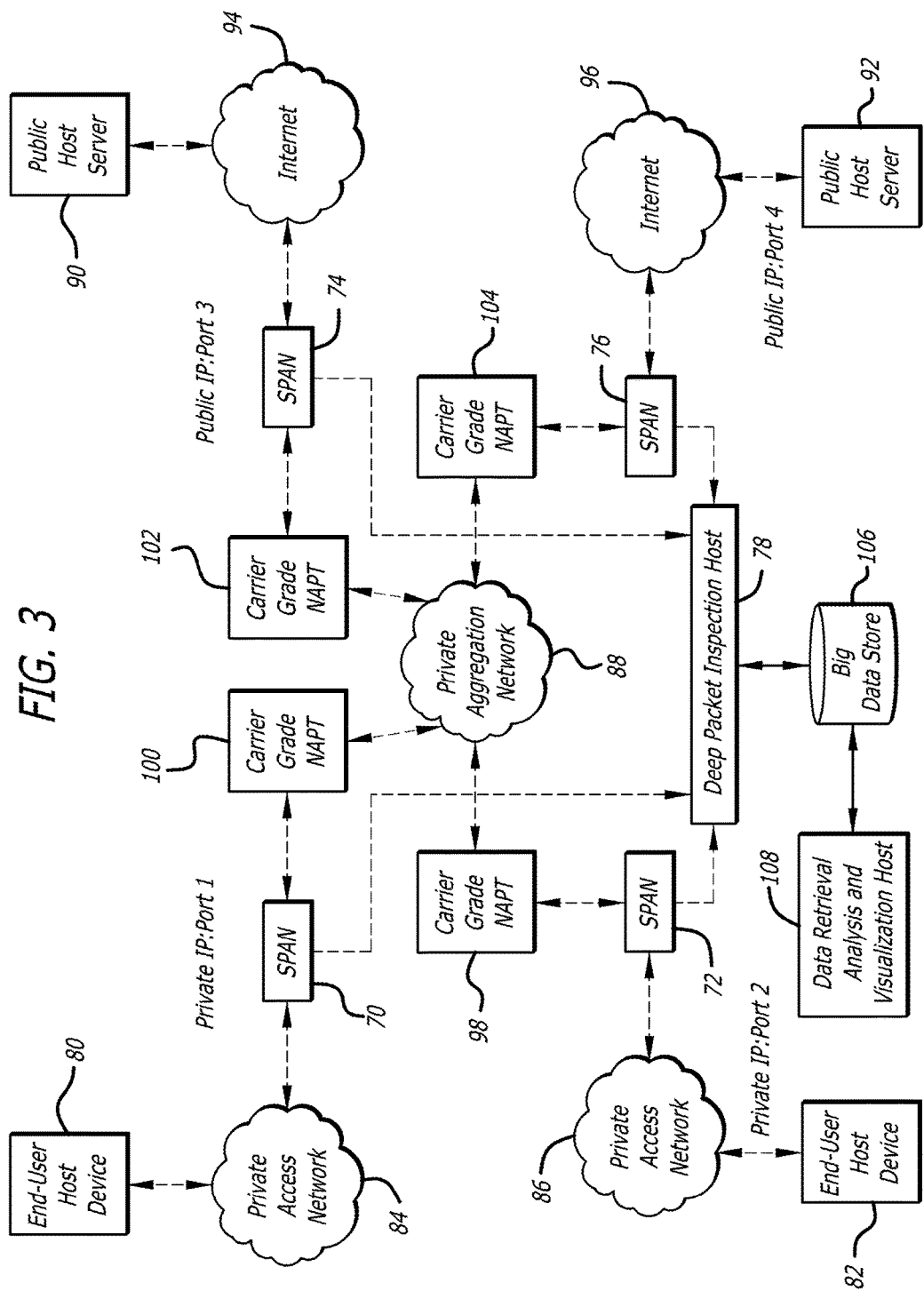
FIG. 3 depicts a complex example of a carrier grade Network Address and Port Translation gateways external logging system.

In yet another embodiment shown in FIG. 3, a complex system involves the multiplicity of traffic streams that may exist amongst three or more hosts and three or more private and public networks. A given packet stream could traverse a single private network, multiple private networks, and combinations of multiple private access, multiple aggregations networks, and multiple public networks.

Similar to previous embodiments, the system of FIG. 3 shows span ports 70, 72, 74, and 76, at the inner-most and outer-most edges of the gateways. As with the other embodiments, the span ports could be on any inside or outside of any gateway. Also similar to the previous embodiments, a DPI host 78 represents the multiple possible configurations of DPI hosts needed to analyze the entire CSP network. In FIG. 3, the End-User host devices 80 and 82 are shown connected to the Private Access Networks 84 and 86, respectively, but they could also be connected to the Private Aggregation Network 88. In certain embodiment, there could be more than one level of access or aggregation networks. Also, as shown, there are public host servers 90 and 92 connected to public networks 94 and 96, respectively. Multiple CGNAPT 98, 100, 102, and 104 are located between the private and public networks 84, 86, 88, 94, and 96 as shown in FIG. 3. Similar to the other embodiments, the DPI host 78 is in communication with a data store 106 that stores the copied data. A data retrieval analysis and visualization host 108 is connected to the data store 58 and may be used to retrieve and analyse the copied traffic.

The present methods enable the derivation of logging records for any communications patterns of any combination of hosts, on any combination of networks, interconnected by any types of CGNAPT.

In general, current systems rely on the CGNAPT/firewall generating logs of the bindings as they occur and exporting those bindings as communications detail records, similar to call detail records (CDR) for telephone systems. However, those logs are not crucial to the billing of the customer, and are forfeited if computer and storage resources are needed for more basic processes associated with service delivery. Thus, while binding are still setup and released, no logging occurs.

The present system and method enables discovery and logging by a node external to the CGNAPT through the use of DPI analysis of the packet streams on both the private and public sides of the CGNAPT. The present system associates the more permanent private IP address and temporary port of the end-user with the temporary IP and port appearing on the public Internet, or the IPX exchange between operators.

Embodiments of the current system have at least two points for intercepting and copying the packet streams and delivering them to a common DPI host. At least one intercept point is on each network of an end-user and covers all egress from that network through CGNAPT to other networks. At least one intercept point will be on each egress from an operator's network to the Internet (public network) or packet exchanges beyond which the operator has no further control. Additional intercept points may be on links by CGNAPT to intermediate networks. More than one DPI host may be used and interconnected via a common data store.

Figure 4:
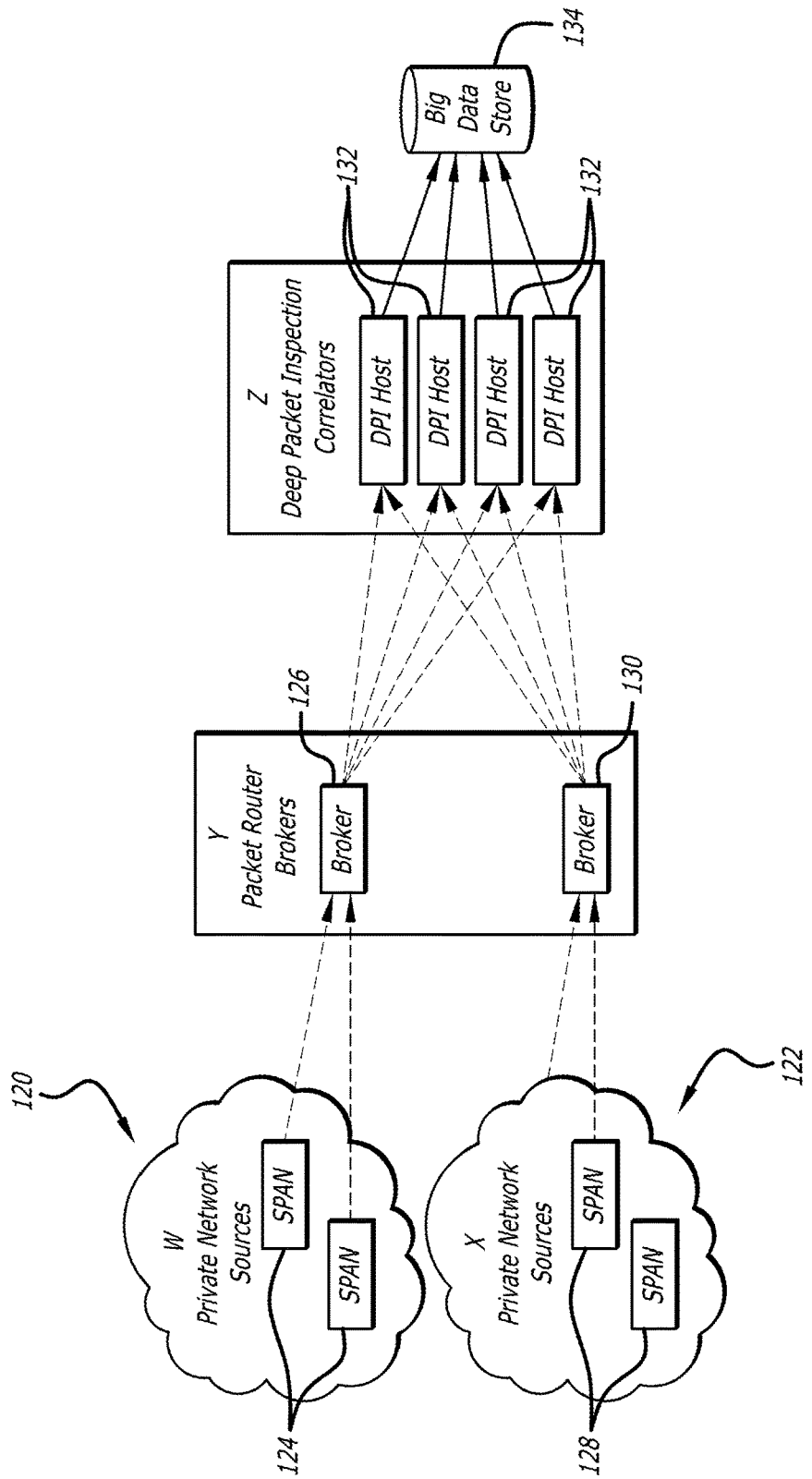
FIG. 4 depicts an example of packet extraction from public and private network sources and distribution by brokers such that related sets of private and public packets can be analysed and logged by load-balanced DPI hosts to compose a carrier grade Network Address and Port Translation gateway external logging system.

In the embodiments shown in FIGS. 1-3, the DPI host 32, 56, and 78 is a single node. However, due to scaling and operator routing issues, the DPI host may really be a complex of nodes as shown in FIG. 4. In one embodiment, the private side traffic 120 could originate or terminate on many private VLANs distributed across an operator's network. Similarly the public side traffic 122 could enter or leave the operator's network at various egress points. Once intercepted, the replicated traffic is unidirectionally routed to the correlation complex.

Still referring to FIG. 4, in one embodiment, private Ethernet Span ports 124 are in communication with a CGNAPT and a first packet router broker 126. Public Ethernet Span ports 128 are in communication with a separate CGNAPT and a second packet router broker 130. The role of the packet router brokers 126 and 130 is to distribute the traffic across multiple DPI hosts 132 while ensuring that both the private side traffic 120 and public side traffic 122 of a CGNAPT corresponding to each unique end-to-end packet session go to the same DPI host. That is accomplished by using the Least Significant Bits (LSB) of the Destination IP Address of Out-Bound packets, which is identical on both Private and Public side of the CGNAPT. Similarly, for In-Bound packets, we use the LSB of the Source IP Address. From the DPI hosts 132, the traffic is stored in a data store 134, which can be accessed by a local or remote computer for retrieval and analysis.

In one embodiment, VLAN tags determine whether the packets are In-Bound or Out-Bound. The VLAN tags are different for In-Bound or Out-Bound, on both the private and public sides of the CGNAPT. That leads to a second function of the packet router brokers 126 and 130, which is to map the In-Bound/Out-Bound VLANs coming from the intercepted network to In-Bound and Out-Bound VLANs to the DPI hosts 132. In that way, the DPI hosts 132 can focus on determining the CGNAPT bindings using only the Out-Bound packets, e.g. TCP SYN.

In certain embodiments, private side (of the CGNAPT) traffic packets are determined through provisioning of the Private Address spaces used by the operator. Likewise, the public side (of the CGNAPT) traffic packets may be identified through the provisioning of the Public IP Address space assigned to the CGNAPT. When the packet stream arrives at the packet broker, the packet broker needs to understand if the source is on the private or public side of the CGNAPT.

Any in-bound packet that can get through without prior out-bound packets does so via static provisioned holes, and as such are known and therefore do not need to be discovered. This type of permanent binding may be monitored, and if necessary measured, counted, and logged at the packet router broker. Such traffic may be discarded by the packet router broker to reduce load on the DPI host.

In certain embodiments, the packet router brokers also may be controlled by the DPI host to measure, count, log, and discard or truncate mid-call flows, or packets of a certain type, such as video frames, to reduce load on the DPI host.

The distribution by packet routers broker 126 and 130 across multiple DPI hosts 132 may be done by using any number of LSBs of the IP addresses. By way of example only, the following shows how 3 bits determine what traffic is directed to which DPI host.

DPI Host 1 receives if:
    LSB=000
    LSB=001
    LSB=010
DPI Host 2 receives if:
    LSB=011
    LSB=100
    LSB=101
DPI Host 3 receives if:
    LSB=110
    LSB=111

In another embodiment, variable numbers of bits could be used to determine what traffic is directed to which DPI host so long as the full number space is covered as shown in the following:

DPI Host 1 receives if: LSB=0
    LSB=000
    LSB=100
    LSB=010
    LSB=110
DPI Host 2 receives if: LSB=01
    LSB=001
    LSB=101
DPI Host 3 receives if: LSB=11
    LSB=011
    LSB=111

Figure 5:
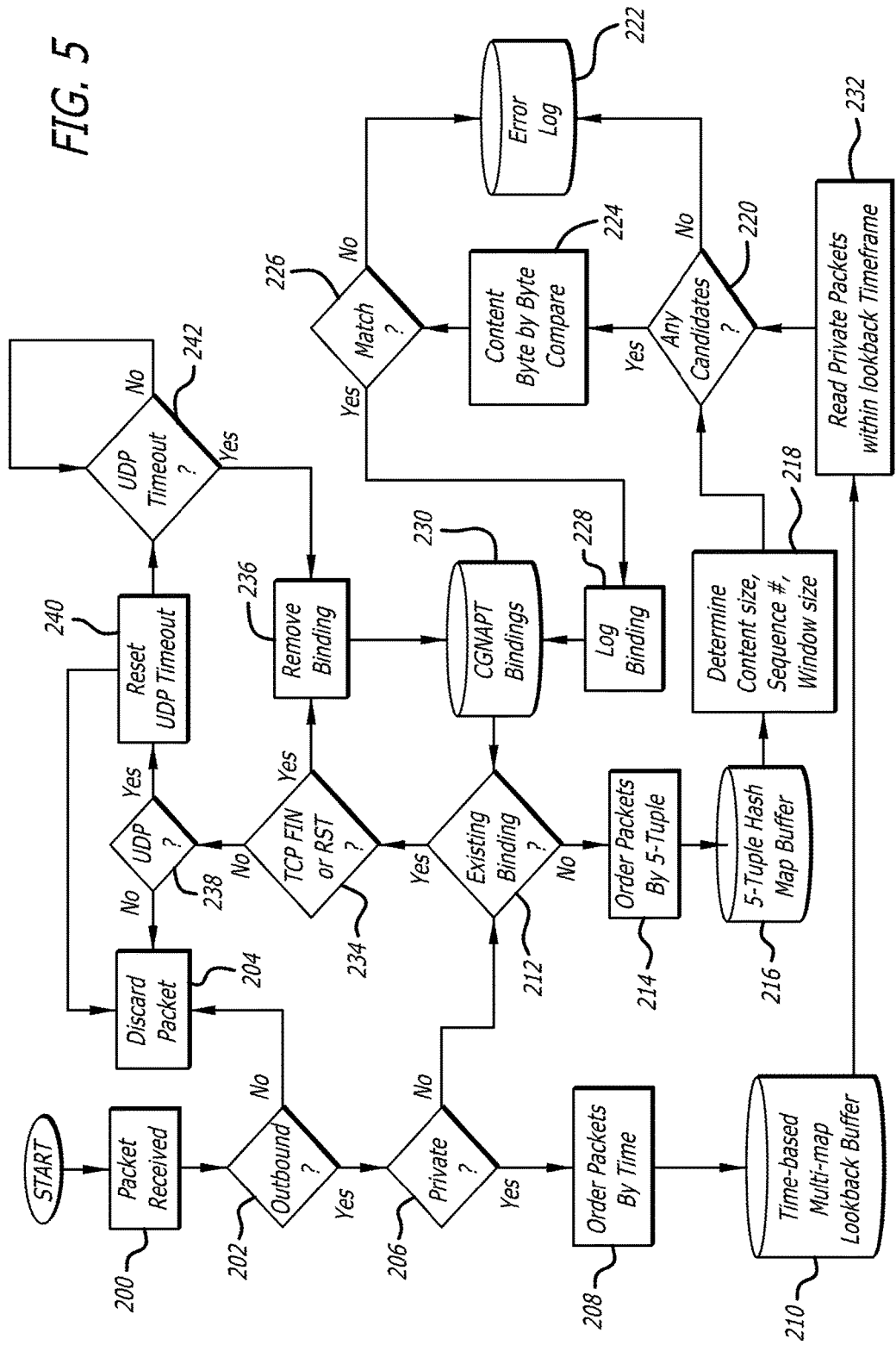
FIG. 5 depicts a flow chart for one embodiment of a process of correlation of private outbound packets and the public outbound packets to determine CGNAPT bindings.

Referring now to FIG. 5, a flow chart of one embodiment of a process of correlation of the private outbound packets and the public outbound packets to determine the CGNAPT bindings is shown. As shown in the flow chart, the first step of the process is to filter out the in-bound packets either using the VLAN tags or identifying that the destination address belongs to the CGNAT or the private IP address space used by the operator. As shown, at step 200 a packet is received and it is determined at step 202 if it is an out-bound packet. If the packet is not an out-bound packet, but rather an in-bound packet, the in-bound packet is discarded at step 204. Next, the process distinguishes the private out-bound packets from the public out-bound packets at step 206. As shown in the flow chart of FIG. 5, the private-side packets are ordered by time at step 208 and maintained in a time-based multi-map lookback buffer at step 210. Private-side packets exceeding the look-back times may eventually be discarded, however, in other embodiments the private-side packets may have no time limit for being discarded.

It is then determined at step 212 if the public-side packets include an existing binding, and if not, the packets are ordered by 5-Tuple at step 214 and maintained in a 5-Tuple hash map buffer at step 216 as shown in FIG. 5. At step 218, the content size, sequence number, and window size of the public-side packets are determined, and then at step 220, it is determined if there are any candidates for the public-side packet. In certain embodiments, destination IP addresses, destination port, and ACK number are also used for correlation. If there are no candidates, the packets are logged as errors at step 222. Public-side packets with candidates are then processed to create bindings. At step 224, the content of the public-side packet is compared byte by byte, and if there is no match at step 226, the unmatched public-side packet is logged as an error at step 222. The byte-by-byte comparison of the remaining candidates of the packet content at step 224 is performed in order to eliminate false positives and determine a match. Some minimum number of bytes beyond which a single candidate is found or until the end of the content to confirm the match. Often 64 bytes is sufficient, however, this may vary.

If there is a match at step 226, then a log binding is created at step 228, which is logged in the CGNAPT at step 230. After that the DPI host may use the information in the log to inform the DPDI host data plane (cavium code) to discard any additional mid-session packets associated with those bindings. It is possible that packets may be queued before the previous steps to discover the binding and before the data plane is informed. But since the public hash table entry is marked as correlation done with private side IP/port recorded (this hash table is also the CGNAPT binding table), any queued public packets belong to the binding would not trigger another round of correlation search. These public packets would be dropped in one embodiment.

For both public and private packets, packets of a flow may be dropped except for packets 1, 2, and 3. Packet 4 also may not be dropped if the flow ends with TCP FIN packet. The system may determine to analyze another 3 packets for both private and public side flows if packet 1, 2, and 3 fail to yield a successful correlation. Correlation can be initiated from either private or public side flows on reception of each packet. On the public side, packet 1, 2, and 3 also are stored in the lookback buffers. Comparison is not ordered. This is very useful to correlate out of order packets or out of order private and public flow arriving time. In one embodiment, incoming packets are kept for a short period of time to determine whether the packets are needed. During the desired amount of time, the packets are used for correlation or the packets are discarded. It is sufficient to determine a correlation between private and public flow using the disclosed metrics.

In this embodiment of the process, a timer based on an over-sizing factor of the provisioned or learned CGNAPT traversal times is used to fetch previously received private out-bound packets, to compare similar values sequentially to eliminate mismatches and narrow down the pool of possible matches. The private-side packets logged in the lookback buffer are read within lookback time frame at step 232 and are processed to receive a binding using steps 220-230 as described above. Normally, a match is found on average around the average latency across the CGNAPT. In one embodiment, conservative look-back accounts are used for slower than normal latency times. Error conditions or missed private side packets may occur. However, if an error does occur, a new public side packet arriving will trigger another correlation operation as described. As long as one packet in a public 5-tuple based flow gets correlated, the job is done for the flow. In this way, the DPI host system itself has very large error recovery margin.

If a binding for the public out-bound packet does exist at step 212, it is determined if the binding is TCP FIN or RST at step 234, then the binding is removed at step 236 and logged in the CGNAPT at step 230. Otherwise, if the binding is determined to be UDP at step 238, then the UDP timeout is reset at step 240. If the UDP timeout at step 242, then the binding is removed at step 236 and logged in the external solution that discovers and logs the start and stop of bindings in the CGNAPT at step 230. If there is also no UDP, then the public out-bound packet is discarded at step 204. That is, this example embodiment of an algorithm is demonstrating the tracking of TCP and UDP flows that create bindings, while discarding other types of packets not of interest. Note that other embodiments may also look for Stream Control Transmission Protocol (SCTP) or other types of packet flows. TCP and UDP are shown here as they are the most widely used.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A system for creating IP data records, comprising:
   a carrier grade network address and port translation node in communication with a private network on an internal side and a public network on an external side, packet streams transmitted between the private network and the public network traverse the carrier grade network address and port translation node;
   a private Ethernet span port disposed on the internal side of the carrier grade network address and port translation node receives packet streams traversing the carrier grade network address and port translation node;
   a public Ethernet span port disposed on the external side of the carrier grade network address and port translation node receiving packet streams traversing the carrier grade network address and port translation node; and
   a deep packet inspection host in communication with the private Ethernet span port and the public Ethernet span port;
   wherein the private Ethernet span port and the public Ethernet span port copy packet streams traversing the carrier grade network address and port translation node and deliver the copied packet streams to the deep packet inspection host.

2. The system of claim 1, wherein the deep packet inspection host correlates and identifies packet streams entering the carrier grade network address and port translation node with packet streams exiting the carrier grade network address and port translation node.

3. The system of claim 1, further comprising a firewall associated with the carrier grade network address and port translation node that modifies elements of the packet stream.

4. The system of claim 1, further comprising host devices connected to the private network sending packets to the host server in the public network through the CGNAPT node triggering it to assign public address and port to that packet stream creating the binding.

5. The system of claim 4, further comprising a communications service provider that assigns private IP addresses to the host devices.

6. The system of claim 5, wherein the carrier grade network address and port translation node assigns a public IP address and creates a binding between the private IP address and the public IP address.

7. The system of claim 6, wherein the carrier grade network address and port translation node sets a timer to remove the binding between the private IP address and the public IP address.

8. The system of claim 1, further comprising a data store in communication with the deep packet inspection host for storing binding records of the copied streaming packets.

9. The system of claim 8, further comprising a data retrieval host in communication with the data store for analyzing the binding records of the copied streaming packets.

10. The system of claim 1, wherein the deep packet inspection host is a hierarchical configuration of multiple deep packet inspection hosts.

11. A method for correlating private outbound packets and public outbound packets to determine the carrier grade network address and port translation bindings, the method comprising:

receiving inbound stream packets and outbound stream packets at a deep packet inspection host from a private Ethernet span port and a public Ethernet span port, the private Ethernet span port disposed on an internal side of a carrier grade network address and port translation node that receives packet streams traversing the carrier grade network address and port translation node between a private network and a public network, and the public Ethernet span port disposed on the external side of the carrier grade network address and port translation node receiving packet streams traversing the carrier grade network address and port translation node;

discarding inbound stream packets collected at the deep packet inspection host;

distinguishing between private outbound stream packets and public outbound stream packets;

ordering by time private outbound stream packets in a lookback buffer;

processing the public outbound stream packets to create bindings;

reading the private outbound stream packets in the lookback buffer and processing the private outbound stream packets to create bindings;

storing the log bindings of the public outbound stream packets and the private outbound stream packets.

12. The method of claim 11, further comprising determining the content size, sequence number and window size of the public outbound stream packets.

13. The method of claim 11, further comprising comparing a portion of one private outbound stream packet with a portion of one public outbound stream packet to determine a match.

14. The method of claim 11, wherein filtering out the inbound packets using VLAN tags.

15. The method of claim 11, wherein filtering out the inbound packets by identifying a destination IP address.

16. The method of claim 11, further comprising buffering the public outbound steam packet according to normal 5-tuple.

* * * * *